A. J. HALL.
REGULATING DEVICE.
APPLICATION FILED MAY 25, 1914.

1,232,915.

Patented July 10, 1917.
3 SHEETS—SHEET 1.

WITNESSES:
Fred A. Lind
D. H. Mace

INVENTOR
Arthur J. Hall
BY
Wesley G. Carr
ATTORNEY

A. J. HALL.
REGULATING DEVICE.
APPLICATION FILED MAY 25, 1914.

1,232,915.

Patented July 10, 1917.
3 SHEETS—SHEET 3.

WITNESSES:
Stephen Wach
D. W. Mace

INVENTOR
Arthur J. Hall
BY
Wesley G. Carr
ATTORNEY

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

REGULATING DEVICE.

1,232,915. Specification of Letters Patent. Patented July 10, 1917.

Application filed May 25, 1914. Serial No. 840,718.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Regulating Devices, of which the following is a specification.

My invention relates to regulating apparatus, with particular reference to torque operated devices for effecting the actuation of a drum controller or other device.

One of the objects of my invention is to provide a device of the above-indicated character which shall be simple, inexpensive and compact in construction and positive and reliable in operation, and which shall be particularly adapted to effect the movements of a control drum in a series of definite steps in accordance with the torque developed.

More specifically, the object of my invention is to provide a torque-operated controller or regulating apparatus for use in connection with a system of control, similar to that set forth in a co-pending application, Serial No. 843,929, filed June 9, 1914, by K. A. Simmon and A. J. Hall, and assigned to the Westinghouse Electric & Manufacturing Co., in which a polyphase dynamo-electric machine is adapted to receive energy from a single-phase alternating current source through a phase converter during motor operation and to deliver energy to the source through the converter when the machine is operated as a generator.

In systems of this type, it is desirable to provide automatic means for adjusting the connections of the phase converter with respect to the source of energy for the purpose of compensating for the inherent phase distortion and voltage reduction resulting from load conditions, both when the machine is operating as a generator and when it is operating as a motor.

Figure 1:
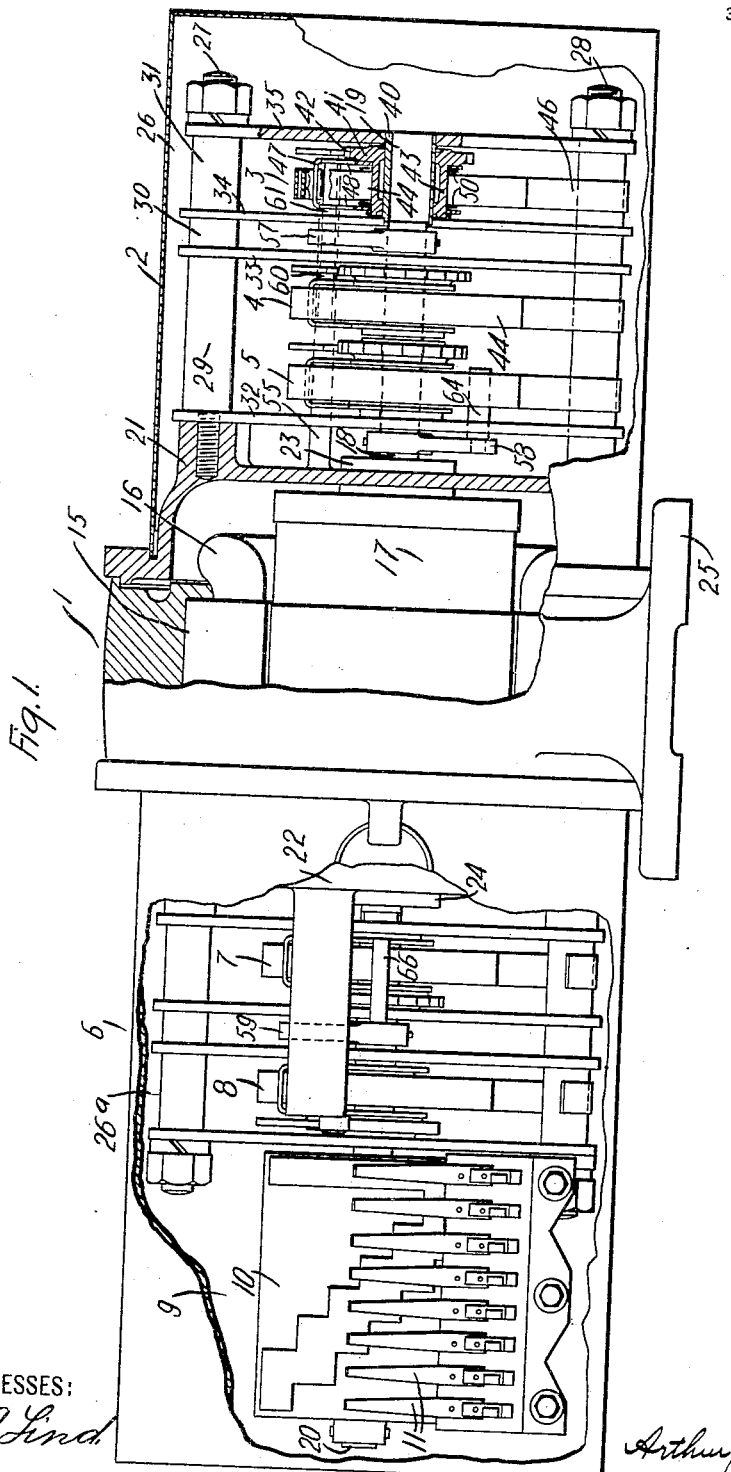
Figure 2:
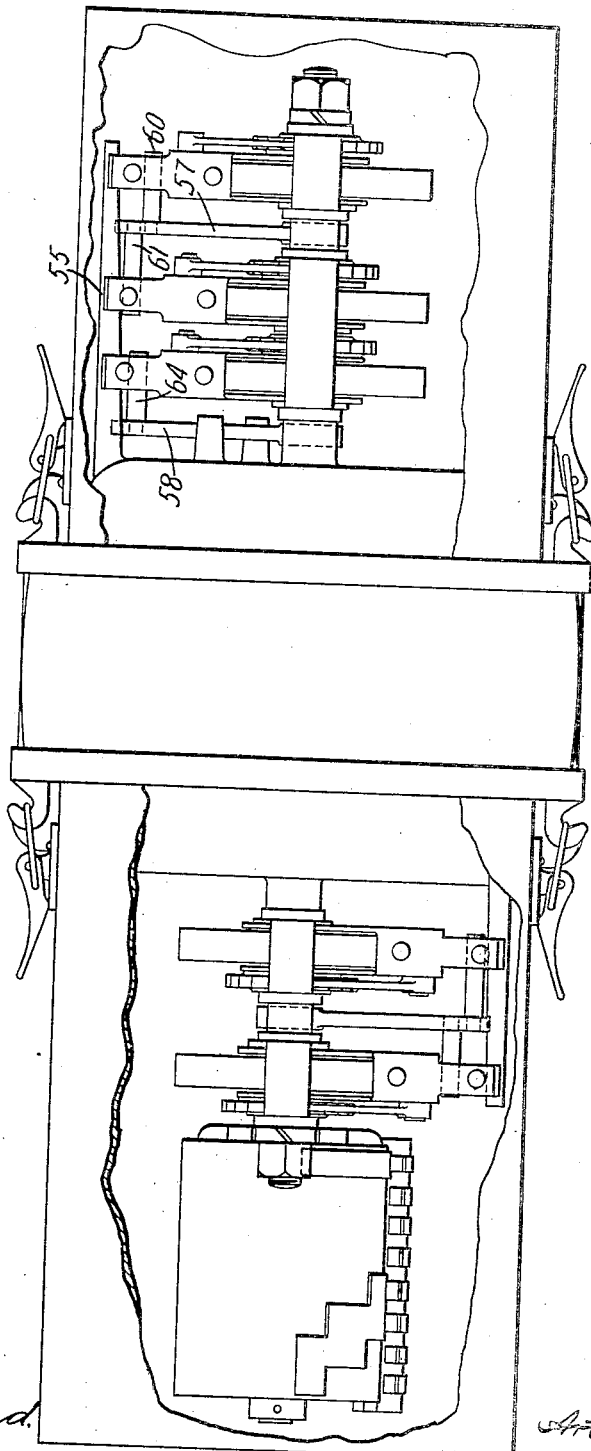
Figure 3:
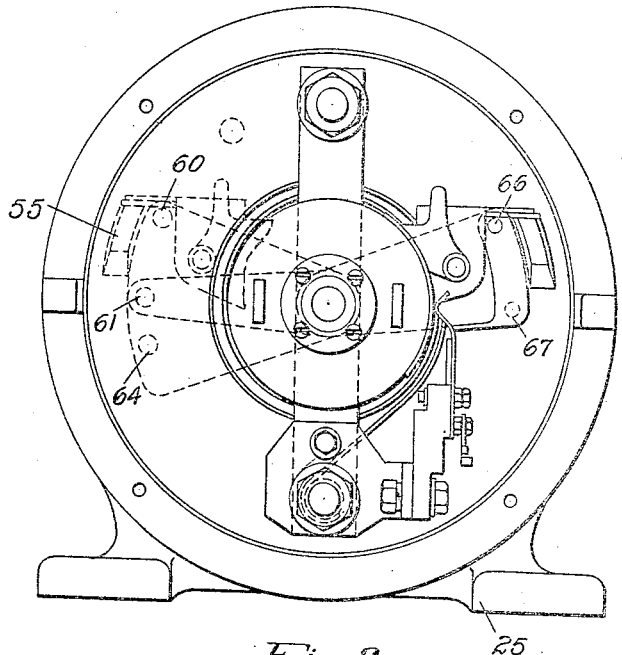
Figure 4:
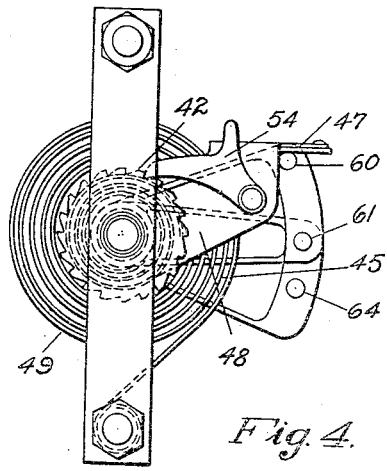

In the accompanying drawing, Figure 1 is a view, partially in section and partially in side elevation, of a torque operated controller embodying my invention; Fig. 2 is a plan view of the device shown in Fig. 1; Fig. 3 is a view, in end elevation, of the structure, looking at the control drum end thereof; and Fig. 4 is a view in end elevation, of a portion of the apparatus, as viewed from the other end of the device.

Referring to the drawings, the apparatus comprises a torque device 1, which preferably constitutes a dynamo-electric machine, although it may take the form of any device adapted to produce torques in opposite directions, a set 2 of torque-opposing devices 3, 4 and 5 for imposing restraint upon the torque device 1, when operated in one direction, a set 6 of torque-opposing devices 7 and 8 for performing a similar function when the torque device 1 is operated in the opposite direction, and a controller 9 comprising a rotatable drum 10 which is actuated by the torque device 1, and a plurality of coöperating stationary contact fingers 11 that are adapted for engagement therewith.

The torque device 1, as shown, comprises a stationary field magnet member 15, provided with suitable windings 16 which are so related as to develop a torque in a rotatable armature or rotor 17 under predetermined conditions. So far as my invention is concerned, the specific structural details and the electric characteristics of the dynamo-electric machine or torque device 1 are unessential, and I, therefore, shall not attempt to set forth its structure and mode of operation further. The rotor or armature 17 is provided with a shaft 18 that projects outwardly in opposite directions, the respective ends 19 and 20 of which are suitably supported by detachable end brackets 21 and 22 that are attached to the sides of the stationary field magnet structure 15 and are provided with bearings 23 and 24 of any well-known construction. For convenience, the structure 15 is provided with supporting brackets or legs 25.

Supporting structures 26 and 26ª are associated with the respective end brackets 21 and 22 and are of similar construction. The supporting structure 26 comprises a plurality of bolts 27 and 28 which are disposed substantially parallel to the shaft 19 and in a vertical plane therewith, being screw-threaded or otherwise attached to the end bracket 21. The bolts 27 and 28 are provided with a plurality of spacing sleeves 29, 30 and 31 which serve to definitely position a plurality of cross members 32, 33, 34 and 35 that are provided with end openings to receive the bolts 27 and 28, and also with openings intermediate their ends through which the shaft 19 projects. The lengths of the various members 29, 30 and 31 are chosen to space the members 32, 33, 34 and 35 and locate them in definite positions, in order to accommodate the torque-opposing devices 3, 4 and 5 in a manner to insure free and reliable operation, as will be hereinafter set forth.

The torque-opposing devices 3, 4, 5, 7 and 8 are of like construction, although the devices 7 and 8 are reversed in position with respect to the devices 3, 4 and 5 for the purpose of performing their respective functions when the direction of operation is reversed. Each of the torque-opposing devices comprises a sleeve 40 which surrounds the shaft 18, a ratchet member 41 having a plurality of teeth 42, and an integral, laterally projecting tubular member 43 which surrounds the sleeve 40 and has a movable bearing thereon, a spiral spring 44 of flat strip material which comprises a plurality of convolutions 45 and has its outer end 46 secured to the bolt 28, while its inner end is fastened, in a suitable manner, to the ratchet member 41 or its tubular portion 43. Pivotally mounted upon the tubular portion 43, is a finger 47, preferably of sheet material, and having bifurcated side members 48 that are provided with openings for receiving the tubular portion 43. The several arms 48 of the finger 47 are disposed on the respective sides of the spiral spring 44 and serve to retain the several convolutions thereof in operative position and alinement. Washers 50 are provided intermediate the spring 44 and the side members 48 of the finger 47, and a pawl 54 is pivotally attached to one of the side members 48 and is adapted to coöperatively engage the teeth 42 of the ratchet 41. It is clear that the tension of the spring 44 may be adjusted to any desired value by turning the ratchet 41 and winding up the spring, after which the pawl 54 is caused to retain whatever tension is effected.

The several torque-opposing devices 3, 4 and 5 are located in side-by-side relation, and their respective spring-actuated fingers 47 are preferably disposed in the same horizontal plane, the ends thereof being supported by a member 55, which may either form an integral part of the end bracket 21 or may be attached thereto. The member 55, therefore, restrains the fingers in position against the tension of their respective springs 44, under normal conditions, when the apparatus occupies its neutral position. The springs 44 are preferably adjusted to have equal tension, although this is unessential.

The shaft 18 is provided with a plurality of arms 57, 58 and 59 which are fixed thereto. The arms 57 and 58 are separated from the adjacent torque opposing devices 3, 4 and 5 by the stationary members 32, 33, 34 and 35. The outer end of the arm 57 is provided with a plurality of pins 60 and 61 which project, in opposite directions, into the plane of the torque-opposing devices 3 and 4, whereby said pins may be brought into engagement with the respective fingers 47 of said devices. The pin 61 is angularly displaced below the pin 60 a predetermined amount. Moreover, the arm 57 is positioned on the shaft 18 so that, when the apparatus occupies its neutral position, the pin 60 just engages the finger 47 of the device 3. The arm 58 carries a pin 64 which projects into the plane of the device 5 and is located a predetermined angle behind the pin 61.

The arm 59 on the other end 20 of the shaft 18 is similarly associated therewith and is provided with pins 66 and 67 which are, respectively, adapted to be brought into coöperative engagement with the torque-opposing devices 7 and 8 and which, moreover, are angularly disposed so that the engagement will be effected successively.

Assuming that the various parts of the apparatus occupy the positions shown, and that the torque device 1 develops a torque in a direction tending to rotate the shaft 18 in a counter-clockwise direction as viewed from the right-hand end of the apparatus, the operation is as follows: The movement of the shaft 18 is initially restricted by the spring 44 of the torque-opposing mechanism 3, which imposes a definite restraining force, for instance, 3 pounds, provided the springs have been adjusted for this value. As soon, however, as the torque device 1 develops sufficient turning moment to overcome the action of the spring 44, the rotor 17 and shaft 18, with their associated control drum 10, are moved into their first position with a positive and relatively rapid movement, which is permitted by reason of the peculiar property of the spiral spring 44 that renders its tension substantially constant throughout a wide range of movement.

When the control drum 10 has been notched up to its second position, the pin 61 on the arm 57 is brought into engagement with the finger 47 of the torque-opposing mechanism 4 and, hence, its associated spring 44 becomes effective in restraining further movement until the torque developed increases to a value slightly in excess of the combined forces of the two springs now in action, namely, six pounds, under the assumed conditions. Immediately upon the predominance of the torque over the combined action of the springs, the shaft 18 and control drum 10 are rotated quickly into the second position, in which the pin 64 of the arm 58 engages the finger 47 of the torque-opposing device 5 and prevents further movement.

The control drum 10, therefore, is moved notch-by-notch through its several positions and its operation is both positive and regular and is dependent upon the torque developed by the torque device 1, of whatever construction it may be.

Without describing the structure and arrangement of the parts associated with the opposite end 20 of the shaft 18, on account of their similarity to those already set forth in detail, it will be understood that the mode of operation and results attained are similar when the torque device 1 moves the shaft 18 and control drum 10 in the opposite direction, the only difference being that but two torque-opposing devices 7 and 8 are provided, and the positions of said devices and the arm 59 are reversed in order to accommodate the reversal of rotative movement.

Obviously, numerous modifications in the specific structural details and in the arrangement and location of parts may be effected without departing from the spirit and scope of my invention, and I desire that only such limitations shall be imposed as are indicated in the appended claims.

I claim as my invention:

1. The combination with a torque device having a rotatable member, of a plurality of torque-opposing devices embodying spiral springs surrounding said member and normally independent thereof, and means associated with said rotatable member for successively causing said devices to oppose the movement of said torque device.

2. The combination with a torque device having a rotatable shaft, of a plurality of fingers pivotally mounted on said shaft, adjustable spiral springs severally associated with said fingers, and means associated with said shaft for successively coöperating with said fingers, whereby said springs are successively brought into action to oppose movements of said torque device.

3. The combination with a torque device having a rotatable shaft, of a plurality of fingers pivotally mounted on said shaft, adjustable spiral springs surrounding said shaft and severally associated with said fingers, means for initially supporting the free ends of said fingers, and a plurality of arms associated with said shaft for successively causing said springs to oppose the action of said torque device.

4. The combination with means adapted for exerting a torque in opposite directions and having a projecting shaft, a plurality of torque-opposing devices associated with the respective ends of said shaft and adapted to successively coöperate therewith in accordance with the torque of said torque-exerting means, and a switching device operatively associated with said torque-exerting means.

5. The combination with a torque device having a rotatable member, of a plurality of torque-opposing devices associated with said rotatable member, each comprising an adjustable sleeve, a spiral spring surrounding said sleeve having one end secured thereto, and an arm associated with said sleeve, means for normally supporting the end of said arm against the tension of said spring, and a plurality of members associated with said rotatable member for successively engaging said spring-actuated arms.

6. The combination with a torque device having a rotatable shaft, of a plurality of torque-opposing devices adapted to successively coöperate with said shaft and each embodying a spiral spring surrounding said shaft and having a substantially uniform tension throughout a wide range of movement.

7. The combination with a torque device having a rotatable shaft, of a plurality of torque-opposing devices adapted to successively coöperate with said shaft and each embodying a bearing sleeve surrounding said shaft, a ratchet having a laterally projecting tubular portion movably mounted upon said bearing sleeve, a spiral spring of strip material surrounding said tubular portion of said ratchet and having one end attached thereto, a bifurcated finger straddling said spiral spring and pivoted upon said tubular member, and a pawl pivotally secured to said finger and adapted to engage said ratchet.

8. The combination with means for exerting a torque in opposite directions and having a rotatable shaft, of a plurality of sets of torque-opposing devices associated with said shaft and respectively adapted to impose restraint upon the movement of said shaft when rotated in opposite directions, each of said torque-opposing devices embodying an adjustable spiral spring surrounding said shaft having a substantially uniform tension throughout a wide range of movement of said shaft.

9. The combination with a rotatable shaft, a controller drum associated therewith, and a torque device for actuating said drum, of a plurality of spiral springs having a substantially uniform tension throughout a wide range, and means for successively causing said springs to oppose the movement of said torque device, whereby said controller drum is adapted to occupy a series of definite positions.

10. The combination with a dynamo-electric machine comprising a stator and a rotor, a shaft for said rotor having projecting ends, and end brackets secured to said stator for supporting said rotor shaft, of a plurality of fingers and actuating spiral springs associated with the opposite ends of said shaft, and a plurality of means rigidly connected to the respective end brackets for positioning said fingers and springs.

11. The combination with a dynamo-electric machine comprising a stator and a rotor, a shaft for said rotor having projecting ends, and end brackets secured to said stator for supporting said rotor shaft, of a plurality of fingers and actuating spiral springs loosely associated with the opposite ends of said shaft, a plurality of arms disposed adjacent to some of said fingers and springs and rigidly secured to said shaft, and a structure associated with each end bracket for spacing apart the fingers and arms of the respective ends of said shaft.

12. The combination with a rotatable member, a plurality of independent members pivotally mounted upon said rotatable member, and spiral springs associated with the said independent members, of means for successively coöperating with said independent members for causing said springs to successively impose restraint upon said rotatable member.

13. The combination with a rotatable member, of a plurality of spiral springs surrounding said member, and means associated therewith for causing said springs to successively impose restraint upon said member when it is rotated.

14. The combination with a rotatable member, a plurality of fingers pivotally mounted thereon, spiral springs surrounding said member and severally associated with said fingers, and means for initially supporting the free ends of said fingers, of a plurality of means associated with said rotatable member for successively causing said springs to impose restraint upon said member when it is rotated.

15. The combination with means adapted to exert a torque in opposite directions and having a projecting shaft, of a plurality of torque-opposing devices associated with said shaft and adapted to successively coöperate therewith in accordance with the torque developed by said torque-exerting means.

16. The combination with means for exerting a torque in opposite directions and having a rotatable shaft and a controller drum mounted upon said shaft, of a plurality of spring-actuated torque-opposing devices associated with said shaft and divided into groups that respectively are adapted to successively coöperate with said shaft when in opposite directions for successively imposing restraint upon the movement thereof in accordance with the torque developed by the torque-exerting means.

17. The combination with a torque device having a rotatable shaft and a controller drum mounted thereon, of a torque-opposing device mounted upon said shaft and comprising a spiral spring, and means for causing said spring to restrain the movement of said shaft during a predetermined portion of the rotation thereof.

18. The combination with a rotatable member, a torque-opposing device associated therewith and comprising an adjustable sleeve, a spiral spring surrounding said sleeve and having one end secured thereto, and an arm associated with said sleeve, of means for normally supporting the end of said arm against the tension of said spring, and a member associated with said rotatable member for coöperatively engaging said spring-actuated arm.

19. The combination with a dynamo-electric machine comprising a stator and a rotor, a shaft for said rotor having a projecting end, and an end bracket secured to said stator for supporting said rotor shaft, of a plurality of fingers and actuating spiral springs associated with the projecting end of said shaft, and a plurality of means rigidly connected to the end bracket for positioning said fingers and said springs.

20. The combination with a dynamo-electric machine comprising a stator and a rotor, a shaft for said rotor having a projecting end, and an end bracket secured to said stator for supporting the rotor shaft, of a plurality of fingers and actuating spiral springs loosely associated with the projecting end of said shaft, a plurality of arms disposed adjacent to said fingers and springs and rigidly secured to said shaft, and a structure associated with said end bracket for spacing apart said fingers and arms.

In testimony whereof, I have hereunto subscribed my name this 21st day of May 1914.

ARTHUR J. HALL.

Witnesses:
H. T. MORRIS,
B. B. HINES.

Copies of this patent may be obtained for five cents each, by addressing the "Commissioner of Patents, Washington, D. C."